Dec. 16, 1941.  J. A. SHUTZ  2,266,339
BORING BAR
Filed Dec. 23, 1940

JOHN A. SHUTZ,
INVENTOR.

BY Donald E. Windle
ATTORNEY.

Patented Dec. 16, 1941

2,266,339

UNITED STATES PATENT OFFICE 2,266,339

BORING BAR

John A. Shutz, Richmond, Ind.

Application December 23, 1940, Serial No. 371,246

3 Claims. (Cl. 77—58)

My present invention relates to boring bars, especially to bars adapted to rigidly hold boring cutters used in forming apertures through steel.

I am aware that, generally speaking, boring bars are old in the art. However, the boring bars heretofore used provide no predetermined graduated means for advancing the cutter members to exact limits but instead, comprise only a boring bar having a cutter member removably secured therein with the only means for adjusting the limits of the cutter member being the securing means, it being necessary to release the cutter member and advancing the same to the approximate position required. Much time is unnecessarily consumed by the operator in providing the necessary adjustment to the conventional type cutting members.

It is therefore, the principal object of the invention to provide a boring bar having means provided therein for adjustably limiting the projection of the cutter member to predetermined positions.

Another object of the invention is the provision of a boring bar having means graduating the position of the cutter member with relation to the axis of the boring bar.

A further object of the invention is the provision of a split boring bar having a threaded screw located therein with the screw providing means increasing or decreasing the space between the split portions of the bar.

A still further object of the invention is the provision of a boring bar which has a micrometer adjustment of the cutter member with relation to the axis of the bar, which is simple of construction and operation, and which is economical to manufacture.

Other objects and advantages of the invention will suggest themselves in the course of the following description, and that which is new will be pointed out in the appended claims.

The most satisfactory means of carrying out the principles of the invention in a practical, efficient, and economical manner is shown in the accompanying one sheet of drawings, in which.

Like characters designate like parts throughout the several views.

Figure 1:
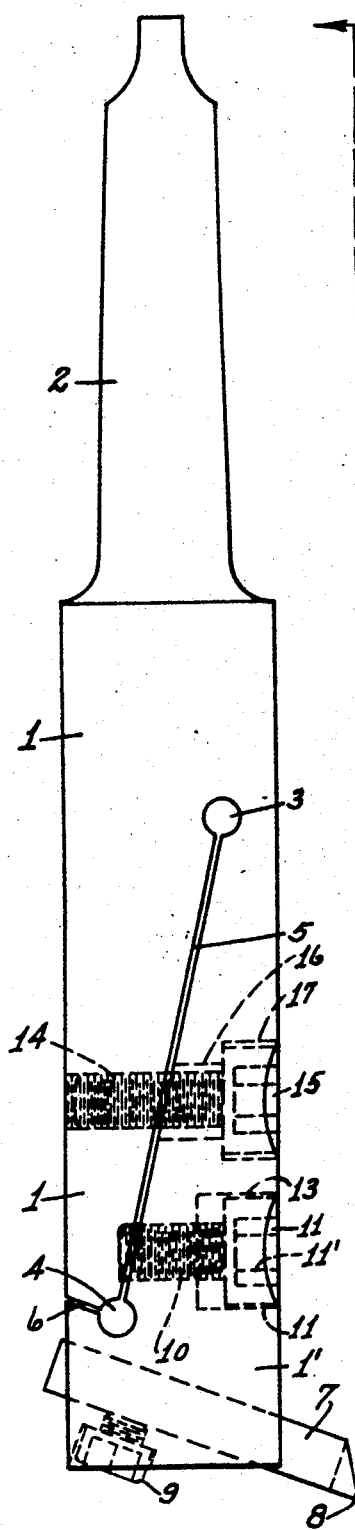
Figure 1 is a side elevation of a boring bar having a cutter member positioned therein and embodying the principles of the invention.
Figure 2:
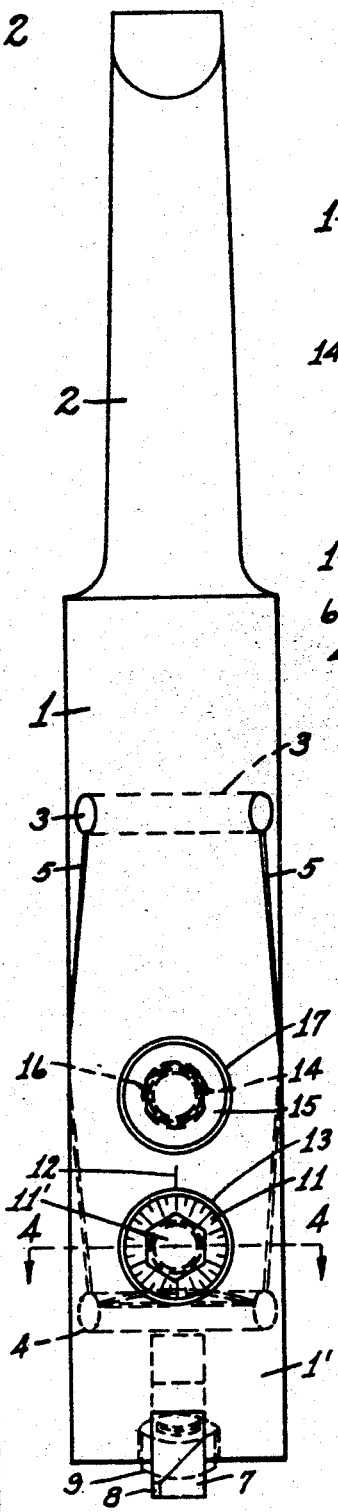
Figure 2 is a front elevational detail view of the device taken from line 2—2 of Figure 1.
Figure 3:
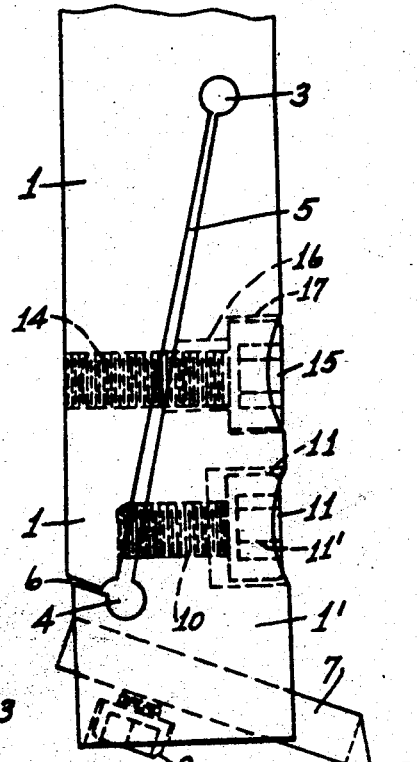
Figure 3 is a side elevation of the lower portion of the boring bar with the same being shown in an adjustable extended position.
Figure 4:
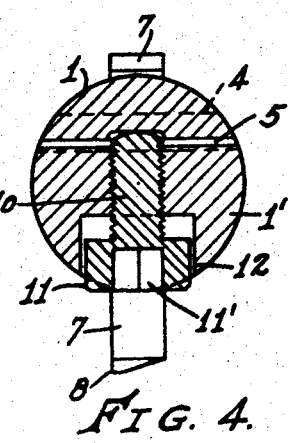
Figure 4 is a detail section through the boring bar taken on line 4—4 of Figure 2.

In order that the construction, the operation, and the advantages of the invention may be more fully understood and appreciated, I will now take up a detailed description thereof, in which I will set forth the same as fully and as comprehensively as I may.

In the drawing, I designates the upper portion and I' designates the lower portion of the body member of the boring bar, the same having the shank portion 2 for the purpose of connecting the bar with a socket member of a boring machine.

Apertures 3 and 4 are formed through the boring bar I with the apertures being in parallel relation with each other and located substantially equidistant from and on opposite sides of the vertical center line of the bar. The bar I is split or cut between the apertures 3 and 4 thereby forming the space 5. A second cut 6 is formed from the aperture 4 to the peripherial surface of the bar. The apertures 3 and 4 together with the spaces 5 and 6 provide means allowing the lower portion I' to be adjustably positioned with relation to the axis of the shank 2 and the upper portion I of the bar.

An angularly disposed aperture is formed through the lower end I' of the bar for the reception of the cutter member 7 which has the cutting point 8 formed thereon. The cutter member 7 is rigidly positioned in the bar by means of the set screw 9 or by other suitable means.

In order to provide accurate adjustment of the cutter member 7 with relation to the axis of the boring bar and shank portion, I have provided the threaded adjusting screw 10 which is threaded into the lower portion I' with the inner end thereof being adapted to bear against the upper portion I. The head 11 of the screw 10 has graduations formed thereon which are adapted to register with the index mark 12 formed on the surface of the body and located adjacent the head 11 of the screw 10. A socket 11' is provided in the head 11 for the reception of an adjusting tool. A counterbore 13 is formed in the bar I' which allows the outer end or head 11 of the screw to be substantially flush with the peripherial surface of the lower portion I'. It is obvious that the turning of the screw 10 will adjustably change the position of the lower portion I' with relation to the upper portion I and with relation to the axis of the shank 2.

In order that the adjustment of the lower portion I' may be maintained in fixed adjusted relation to the axis of the upper portion 1, I have provided the screw 14 which projects through the aperture 16 of the lower portion 1' and is threaded into the upper portion 1. A counterbore 17 is provided in the portion 1' for the reception of the head 15 of the screw 14. In order to adjust the portion 1' outwardly by means of the adjusting screw 10, it is necessary to loosen the screw 14, after which the adjusting screw 10 may be turned, and providing the desired adustment to the lower portion 1' with relation to the axis of the upper portion 1 and the shank 2. After the proper adjustment is made by means of the adjusting screw 10, the screw 14 is then tightened, thereby providing rigidity to the members.

It is obvious that by turning the screw 10 inwardly, the space 5 between the upper portion 1 and the lower portion 1' is increased by reason of the inner end of the adjusting screw 10 bearing against the portion 1. Turning of the screw 10 outwardly obviously allows the lower portion 1' to retract, by the inherent resiliency of the members, to its aligned relation to the axis of the upper portion 1 and the shank 2.

In the use of the device, the shank 2 is inserted in a socket adapted for the purpose with the socket being secured to a spindle of a boring machine. In boring holes in steel members, the position of the cutter member 7 is adjusted to approximate position and is secured in position by means of the set screw 9 or by other suitable means. The boring operation is accomplished by a rotary motion of the boring bar and with the cutting point engaging the stock being bored. When adjustment is necessary to increase the diameter of the hole being bored, the boring bar is withdrawn from the hole and the screw 14 is loosened, after which the correct amount of extension of the cutting point is obtained by turning screw 10 inwardly. The screw 14 is then tightened, thereby maintaining the lower portion 1', together with the cutting point, in correct diametral position with relation to the axis of the shank 2, after which the boring operation may be continued.

The radial graduations on the head 11 of the screw 10 may, if desired, be numbered in order that settings may be duplicated.

The apertures 3 and 4, together with the spaces 5 and 6, provide resiliency at the cutting point to a certain extent over the conventional solid boring bars, and permit the attainment of a more highly finished surface in the finished bored holes than is obtainable with the conventional solid boring bars.

It is to be understood that minor changes may be made in the several parts and in the details herein shown and described, insofar as the changes may fall within the scope of the appended claims.

Having now fully shown and described the invention, what I claim, and desire to secure by Letters Patent of the United States, is:

1. A boring bar comprising a body member having an upper and a lower portion, with the upper and lower portions having a normally common axis, a screw threaded through the lower portion with its inner end normally bearing against the upper portion and providing adjustment between the upper and the lower portions, and a second screw threaded into the upper portion and extending through the lower portion with the second screw providing an adjustably fixed relation between the upper and the lower portions in accordance with the spacing established by means of the first screw.

2. In a boring bar having a body comprising an upper portion and a lower portion capable of axial alignment and with the upper and lower portions being integrally connected, an adjusting screw threaded into the lower portion with the inner end thereof bearing against the upper portion, a second screw extending through the lower portion and threaded into the upper portion and maintaining the adjustment established between the upper and lower portions by means of the adjusting screw, radial graduations formed on the head portion of the adjusting screw adapted to be aligned with an index mark formed in the adjacent peripherial surface of the body.

3. In a boring bar comprising a body member having a pair of apertures formed therethrough one above the other with the apertures being connected with a continuous cut through the body and with a second cut being made from the lowermost aperture through the body to the peripherial surface thereof and forming an upper portion and a lower portion connected only by the portion remaining between the uppermost aperture and the peripherial surface of the body, an adjusting screw threaded through the lower portion with the inner end thereof bearing against the upper portion and providing means changing the axial position of the lower portion with relation to the axial position of the upper portion, and a second screw extending through the lower portion and being threaded into the upper portion and normally maintaining the relative adjustment between the upper portion and the lower portion established by the adjustment of the adjusting screw.

JOHN A. SHUTZ.